United States Patent [19]
Snitzer et al.

[11] Patent Number: 5,299,210
[45] Date of Patent: Mar. 29, 1994

[54] FOUR-LEVEL MULTIPLY DOPED RARE EARTH LASER SYSTEM

[75] Inventors: Elias Snitzer; Robert Pafchek, both of Piscataway, N.J.

[73] Assignee: Rutgers University, New Brunswick, N.J.

[21] Appl. No.: 876,020

[22] Filed: Apr. 28, 1992

[51] Int. Cl.$^5$ .................................... H01S 3/14
[52] U.S. Cl. ............................ 372/6; 372/41; 385/115; 385/127; 385/142
[58] Field of Search ............... 372/6, 39, 40, 41; 385/115, 142, 144, 126, 127

[56] References Cited

U.S. PATENT DOCUMENTS

| | | | |
|---|---|---|---|
| 2,462,547 | 2/1949 | Pitha | 252/301.4 |
| 3,418,247 | 12/1968 | Yocom | 252/301.4 |
| 3,617,937 | 11/1971 | Mazelsky | 331/94.5 |
| 3,729,690 | 4/1973 | Snitzer | 331/94.5 |
| 3,764,195 | 10/1973 | Blank et al. | 385/1 |
| 3,866,142 | 2/1975 | Cline | 331/94.5 |
| 3,948,798 | 4/1976 | Ferri | 252/301.4 |
| 4,004,178 | 1/1977 | Riseberg | 313/468 |
| 4,015,217 | 3/1977 | Snitzer | 331/94.5 |
| 4,044,315 | 8/1977 | Snitzer | 331/94.5 |
| 4,321,559 | 3/1982 | Esterowitz | 372/41 |
| 4,713,820 | 12/1987 | Morris | 372/41 |
| 4,863,237 | 9/1989 | France | 385/141 |
| 4,923,279 | 5/1990 | Ainslie et al. | 385/142 |
| 4,990,480 | 2/1991 | Luetkens | 502/204 |
| 5,043,308 | 8/1991 | Luetkens | 502/204 |
| 5,064,271 | 11/1991 | Kern et al. | 385/123 |
| 5,157,674 | 10/1992 | Lawandy | 385/141 |
| 5,173,960 | 12/1992 | Dickinson | 385/100 |

*Primary Examiner*—Frank Gonzalez
*Attorney, Agent, or Firm*—Peter K. Trzyna; Richard A. Speer

[57] ABSTRACT

A system for producing an optical gain, the system including a host having a light conducting path doped with thulium, holmium, and at least one rare earth selected from the group consisting of europium and terbium in respective amounts sufficient to produce an optical gain by energizing the thulium to a $^3H_4$ state to produce an optical gain by a $^3H_4$–$^3F_4$ transition, producing a 1.47 $\mu$m wavelength output. There is subsequent energy transfer from the $^3F_4$ state of the thulium to a $^5I_7$ state of the holmium, and energy transfer from the $^5I_7$ state to the rare earth selected from the group consisting of europium and terbium. The system can include oscillator, amplifier, and superluminescence source configurations. A method for making and a method for using the system are included.

36 Claims, 2 Drawing Sheets

FOUR-LEVEL MULTIPLY DOPED RARE EARTH LASER SYSTEM

I. BACKGROUND OF THE INVENTION

A. Field of the Invention

This invention relates to coherent light generators, and more particularly to plural active media or active media having plural dopants. The invention includes an optical fiber doped with thulium and holmium and europium, terbium, or a mixture thereof. The optical fiber is used in a four-level laser system having an optical gain about a wavelength of 1.47 μm. A method for making and a method for using this optical fiber are also provided.

B. Description of the Related Art

A method of lasing involves exciting an active medium or optical fiber core by light energy. The light energy is produced by a source known as a "pump," which is typically coupled to the optical fiber to pump energy to ions in the core. In some situations, the pump energy may be absorbed by non-lasing energy levels. However, upon receipt of the energy some ions have electrons which are boosted to higher energy levels or "states." But an electron can only stay at higher energy levels for a limited amount of time before giving up its extra energy and falling to lower energy levels in what is termed a "transition." Also, a fluorescent (i.e., lasing) transition may be reabsorbed, resulting in "excited state absorption." Otherwise, however, this energy given up produces light at certain wavelengths—the laser light emitted by lasers.

Optical amplifiers, optical oscillators, superluminescence sources, medical lasers, and particularly optical communications systems have been designed to operate within certain wavelength ranges (i.e., "windows"), and one such window includes the 1.5 μm wavelength for telecommunications applications. Erbium-based laser systems previously have been used to amplify such signals in telecommunications applications, but these have been operated as three-level laser systems. A three-level laser system has a transition that terminates in the ground state.

Three-level systems have several significant limitations, however. In a three-level system, the energy levels that fluoresce overlap those that absorb. Thus, a powerful light must be used to excite enough ions to operate the laser.

Four-level systems involve laser transitions which do not terminate in the ground state. Instead, the transitions terminate in a state that is initially unpopulated by electrons.

A four-level laser system has been made using fluoride glass doped with thulium to operate in a spectral region about 1.47 μm. Fluorescence from such a system has a broad energy band extending from 1.40 μm to 1.53 μm and providing a widely tunable light source. This is useful for a broad band light amplifier, particularly for wavelength division multiplexed systems. Also, the 1.47 μm wavelength produced by such a laser system is within another commonly used telecommunications window.

However, this approach has suffered from a problem: The electrons energized to a $^3H_4$ energy leveling thulium have a longer lifetime then those occupying a $^3F_4$ lower energy level. As a result, the electrons in the upper energy level descend to the lower level more quickly than the lower level is emptied. This problem is known as "terminal state bottlenecking" and results in self-terminating behavior of the laser light emission.

G. Rosenblatt, R. Ginther, R. Stoneman and L. Esterowitz, "Laser Emission at 1.47 μm from Fluorozirconate Glass Doped with $Tm^{3+}$ and $Tb^{3+}$," a paper presented at the Tunable Solid State Laser Conference, Cape Cod, Mass. (1989) (ROSENBLATT) suggested using terbium to eliminate this terminal state bottleneck. However, the suggested use of terbium not only resulted in a reduction of the terminal state population but also resulted in a reduction of the population of the upper laser level as well. Because laser light output is related to the ion population energized to the upper laser level, the operating efficiency of the ROSENBLATT laser was significantly diminished. Thus, this approach was not successful in producing an efficient, continuous-wave laser with the desired wavelength output.

Therefore, an efficient four-level laser system operable at the 1.47 μm region has eluded those skilled in the art despite their concerted efforts, and solving the terminal state bottlenecking problem without significantly decreasing laser efficiency has posed a significant barrier in the development of such a four-level laser.

II. SUMMARY OF THE INVENTION

It is an object of the present invention to provide a laser system that addresses the above-mentioned problems.

It is a further object of the present invention to eliminate the self-terminating behavior of thulium doped laser systems.

It is another object of the present invention to provide an optical fiber doped with rare earths to produce a gain for a wavelength region of 1.47 μm (i.e., 1.40 μm–1.53 μm) in either a continuous or rapidly pulsed fashion.

It is a further object of the present invention to provide a laser which may be used as an amplifier for laser systems.

It is another object of the present invention to provide an optical fiber for use as a superluminescence source.

Still another object of the present invention is to provide a laser for use in an oscillator.

Still another object of the present invention is to provide a four-level laser for optical communications applications.

Yet another object of the present invention is to provide an optical fiber suitable for a double clad configuration.

Still another object of the present invention is to provide an additional dopant to reduce concentration quenching of the thulium ions.

It is still another object of the present invention to provide a laser pump which reduces excited state absorption.

These and other objects that will be apparent from the following disclosure are accomplished by a laser system having a host with a light conducting path doped with thulium and holmium, as well as a rare earth selected from the group consisting of europium, terbium, or a mixture thereof. The laser is doped with these elements in respective amounts sufficient to produce an optical gain from energizing the thulium to a $^3H_4$ state to produce an optical gain by a $^3H_4$–$^3F_4$ transition and an optical gain in a region of 1.47 μm, with subsequent energy transfer from the $^3F_4$ state of the thulium to a $^5I_7$ state of the holmium, and energy transfer from the $^5I_7$ state of the holmium to the europium and/or terbium or other means for depopulating the $^5I_7$ state.

III. DESCRIPTION OF THE DRAWINGS

IV. DETAILED DESCRIPTION OF THE INVENTION

Figure 1:
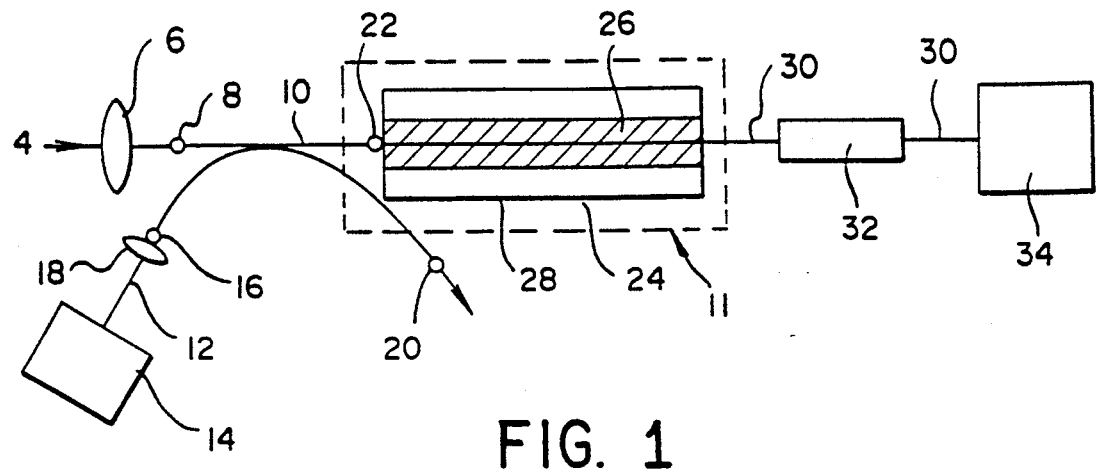
FIG. 1 is a diagram of the present invention utilized in an amplifier system.

A preferred embodiment according to the present invention is illustrated generally in an amplifier configuration, laser system 11, which for example can be used to amplify a telecommunications signal. FIG. I shows signal light 4 being directed via a lens 6 into an input port 8 of a dispersive coupler 10. A dispersive coupler is a commercially available component. The properties of dispersive couplers vary with the wavelength to permit light input from two ports to be combined and channeled to predominantly output at one of two output ports.

A light 12 from a source 14 is directed to a second input port 16 of the dispersive coupler 10 by a lens 18. A first output port 20 outputs small portions of pump light 12 and signal light 4, 10% or less, that can be used for monitoring the laser system. A second output port 22 outputs most of pump light 12 and signal light 4 into an optical fiber 24 (illustrated in an enlarged view in FIG. 1). The optical fiber 24 has an optical conducting path including a core 26 that is surrounded circumferentially by at least one cladding 28. When there are more ions in the excited energy state than in the ground state and enough to overcome any system losses, the signal light 4 gets amplified to become light 30. Light 30 may be communicated to an optical isolator 32, which removes undesired back reflection as light 30 is further communicated into an applications system 34.

What has been described is an amplifier laser system 11 in which the signal light 4 and the pump light 12 are made to enter from the same end of the optical fiber 24. This configuration is a "co-propagating pump" scheme. Alternatively, one may have the signal light 4 enter another end through a similar type of dispersive coupler. This second configuration is a counter-propagating pump scheme. A third approach is to have the pump light 12 enter from both ends, which is called a bi-directional pump scheme. In any of these cases, the pump light 12 and the signal light 4 are communicated to the active ions in optical fiber 24.

Optical fiber 24 is made of a host material and thulium, holmium, and europium and/or terbium or other equivalent substance(s) to permit a four-level laser operation at the 1.47 μm region. These substances are preferably added to molten glasses used to make the core 26 and cladding 28. The core glass can comprise between 0.01 and 1.0 mole percent thulium and 0.10 and 2.0 mole percent holmium. The third substance of europium, terbium, or a mixture thereof, is also added to the core and/or cladding glass. In addition, dopants can also be added to these glasses without departing from the present invention.

The host material for the core 26 can, for example, be a fluoride or other halide glass composition (though a telluride or oxide glass host are other possibilities). An illustrative composition is as follows: between 40 and 60 mole percent of zirconium fluoride, $ZrF_4$, between 15 and 25 mole percent of barium fluoride, $BaF_2$, between 0 and 6 mole percent lanthanum fluoride, $LaF_3$, between 2 and 5 mole percent of aluminum fluoride, $AlF_3$ and between 0 and 25 mole percent of sodium fluoride, NaF. A preferred composition has about 53 mole percent of zirconium fluoride, $ZrF_4$, 20 mole percent of barium fluoride, $BaF_2$, 0 to 6 mole percent lanthanum fluoride, $LaF_3$, 3 mole percent of aluminum fluoride, $AlF_3$ and 20 mole percent of sodium fluoride, NaF. In addition to these formulations, the thulium, holmium, and europium and/or terbium are added. Lead and hafnium can be added as dopants to respectively increase and decrease the index of refractor.

Generally, in another embodiment of the invention, the total amount of the added substances is that which is necessary to replace lanthinum in a ZBLAN glass formulation. However, specific proportions and amounts may vary as is subsequently discussed.

In a preferred method for making the present invention, the fluoride glass composition and the above-referenced substances are melted in a vitreous carbon crucible under nitrogen for one hour at 800° C. The temperature is decreased to 675° C. and the melt is fluorinated using $SF_6$. The melt is poured at 600° C. into gold-coated brass molds held at 250° C. and then cooled slowly to room temperature to form a glass rod. The rod is withdrawn from this mold polished to about 0.3 μms and etched to remove any residual polishing scratches and contamination. The rod is then heated to 250° C. and a mixture of 10% $SF_6$ in nitrogen is used to remove surface water. The rod is drawn to produce a fiber without a cladding. This fiber is then inserted into a tube to make a combination from which the optical fiber 24 is drawn.

The tube may be fabricated, for example, by allowing a certain amount of glass to solidify along the wall of a mold. After an amount of glass proportional to the cladding has cooled, the shutter is opened allowing the glass in the center of the mold to be removed.

Another approach is spin casting glass into a tube form. This involves injecting an amount of molten glass sufficient to form the tube into a mold which is then spun so that centripetal force will urge the glass into a tubular form. Using either of these methods (or other methods for making a tube), the tube must have an interior diameter slightly greater than the diameter of the rod to be inserted therein.

The rod, made with a glass having a higher index of refraction than that of the tube, is inserted in the tube to form a combination. The combination is then heated to the point where both the rod and tube are softened and joined, usually by vacuuming a space between the rod and tubes. However, it may be that only a slight vacuum or no vacuum at all is preferable. The combination is then drawn into optical fiber 24.

Alternatively, one can start with the rod and cast as many other layers around the rod as are necessary for the particular embodiment desired. For example, one cladding layer is sufficient for many applications, but to a double clad configuration requires more than one layer, each with successively lower indexes of refraction.

Figure 3A:
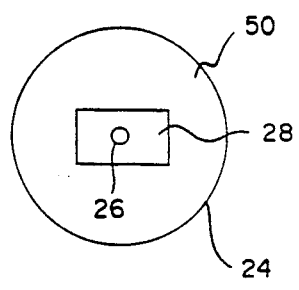
FIGS. 3A-3C are diagrams of the present invention utilized in double cladding configurations.
Figure 3B:
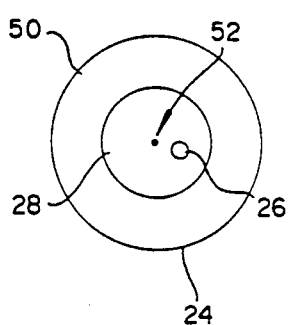

Generally, in laser devices employing of the present invention, such as the amplifier laser system 2 in FIG. 1, pump light 12 is used to excite active ions in the optical fiber 24, either directly into an end of the core 26 or in to the interior cladding in a double clad configuration (see FIGS. 3A and 3B). As the active ions are energized, the concentration of ions in a higher energy level begins to exceed the concentration in lower energy levels. This phenomenon is referred to as an "inversion". When an inversion occurs, there is a greater probability of emitting energy than absorbing it, so amplification of the light emission occurs.

In a preferred implementation, light at 792 nm or at 685 nm is pumped into the system. The ideal pump 14 would produce the least amount of excited state absorption and the greatest gain at a 1.47 $\mu$m. The pump 14 can, for example, be a titanium-sapphire laser or an appropriate laser diode. Also, the pump light 12, can be continuous or rapidly pulsed. A pulsed laser can be useful for medical and sensing applications.

Figure 2:
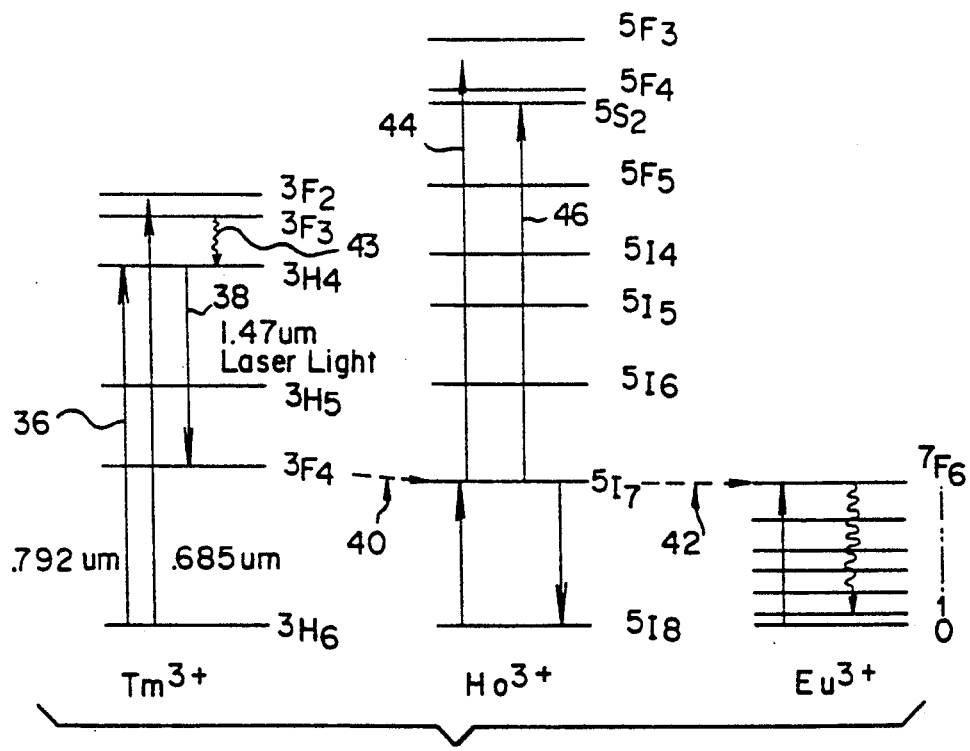
FIG. 2 shows the energy state diagram of the laser of the present invention

For a laser of the present invention, FIG. 2 shows an energy level diagram, i.e., the transitions made by the electrons of active ions in the core 26. The ions' electrons energized by pump light 12 populate the thulium $^3H_4$ upper energy level, as represented by arrow 36. These ions then "radiatively decay" with the electrons dropping to the $^3F_4$ level, as represented by arrow 38, producing the laser emission at a 1.47 $\mu$m wavelength. Energy transfer then occurs from the $^3F_4$ energy level of the thulium to the $^5I_7$ energy level of the holmium, as represented by dashed line 40. The energized holmium ions then transfer energy to the europium and/or terbium ions, as represented by dashed line 42, which then decay down to the ground state by non-radiative transitions.

A critical feature of the present invention is the addition of a means for depopulating the $^5I_7$ level in holmium by providing closely spaced energy levels suitable for allowing rapid non-radiative decay to the ground state. Europium and/or terbium are preferred dopants for the invention, the total amount of which should be at a low level, for example, between 0.30 and 0.01 mole percent or less. Higher concentrations will significantly decrease laser efficiency by depleting the lasing energy level.

Terminal state bottlenecking occurs in thulium doped systems because the radiative lifetime of the upper $^3H_4$ energy level is approximately 1.6 ms, and the lower thulium $^3F_4$ energy level has a radiative lifetime of 10.0 ms, which results in self-terminating laser behavior. This condition is removed by the use of the holmium in the present invention, which depopulates the terminal state without seriously depleting the upper laser level of the thulium. The addition of the holmium decreases the radiative lifetime at the terminal level from 10.0 ms to 0.40 ms as a consequence of the radiative overlap of the fluorescence spectrum of the europium and/or thulium with the absorption spectrum of holmium in the 1.8 $\mu$m region. Consequently, the efficiency of the present invention is substantially higher than that of the ROSENBLATT system.

Another complication arises from energy absorption from the $^5I_7$ level of the holmium. Because a significant number of ions occupy this state, excited state absorption of the pump light 12 can lead to excited state absorption represented by arrow 46, which robs the system of laser light. This situation can be remedied by using a pump light 12 near a wavelength of 685 nm. This wavelength results in thulium ions being energized to either the $^3F_2$ or $^3F_3$ energy levels. The electrons in the $^3F_2$ energy level descend to the upper laser energy level by a quick non-radiative transition represented by arrow 43.

However, one problem with having too many thulium ions is that the ions in the higher energy level may interact with another ion in the ground state. This leads to non-radiative transitions of the high energy ions and the ions in the ground state to intermediate states, resulting in a buildup of ions in the lower laser level and subsequent non-radiative transitions down to the ground state. This phenomena, known as "concentration quenching" reduces or eliminates the excitation of the ions in the desired light emitting energy state. Thus, the amount of thulium, and indeed all constituents to be used for a given host should be determined by testing glass samples to identify amounts that optimally avoid concentration quenching.

Additionally, it seems that the holmium acts to disperse the thulium ions, which tends to reduce concentration quenching that might otherwise occur when the thulium ions are clustered. The present invention includes the use of a dopant dispersant for active ions to increase efficiency and reduce concentration quenching.

Another type of quenching is "phonon quenching," which occurs because of energy interactions between the host ions and the active ions. This is minimized by the use of host glasses with low energy phonon spectra, such as a fluoride or other halide glass, although any host that permits the energy transfer scheme of the present invention is a viable candidate.

FIG. 3 illustrates three different configurations of the present invention. The first, FIG. 3A, shows an optical fiber 24 with a core 26 surrounded by a rectangular cross section cladding 28. A second cladding 50, having still a lower index of refraction, circumferentially surrounds the first cladding 28. Apparently, since all modes fill this rectangular cladding geometry, light launched into a first cladding 28 will eventually reach the core 26. This scheme also allows the core 26 to remain centered, a desirable characteristic with regard to alignment with other fibers.

In the second configuration shown in FIG. 3B, the core 26 is offset from the center axis 52 of the optical fiber 24. Core 26 is surrounded by first cladding 28, which in turn is surrounded by second cladding 50. Normally, some of the light does not travel straight down the optical fiber 24, and an off center core configuration seems to receive more of the "skewed" light rays than a centered configuration does. Recovering more light helps increase system efficiency.

The embodiments shown in FIGS. 3A and 3B are advantageous because the pump light 12 can be coupled into the large diameter first cladding 28 and absorbed as it propagates down the optical fiber 24. These configurations would also allows the rare earth's to be added to the first cladding 28, perhaps in increased concentrations.

Figure 3C:
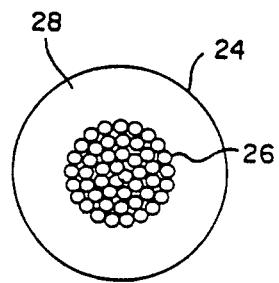

Another embodiment, shown in FIG. 3C, involves an optical fiber having a core 26 composed of a bundle of strands small enough that non-radiative transfer can occur from strand to strand. Although combinations of the above-mentioned substances could be used in each strand, an advantage of a multi-strand core 26 is that it can be used to isolate constitutes that might otherwise have energy transfer interactions that would reduce laser efficiency. For example, at least one of the strands can be doped with thulium and at least one other can be doped with the holmium with the europium and/or terbium. Such a configuration may help reduce non-radiative energy losses from certain thulium transitions.

Figure 4:
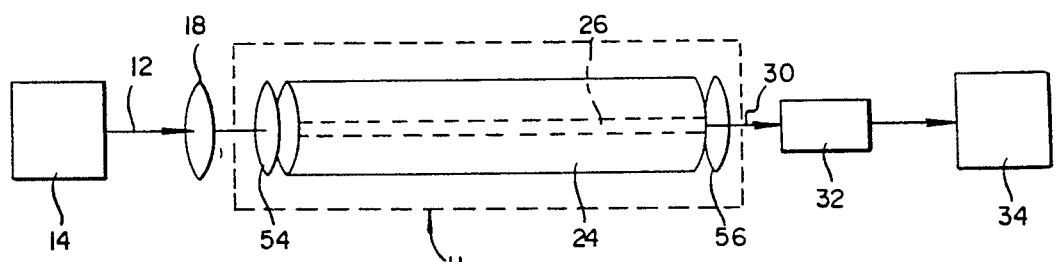
FIG. 4 is a diagram of the present invention in an oscillator configuration.

The aforementioned embodiments have been discussed with reference to an optical amplifier. However, the energy transfer scheme in the above-described optical fibers can also be incorporated into an oscillator system 11, as illustrated in FIG. 4. FIG. 4 shows a pump 14 producing light 12 communicated to optical fiber 24 via a focusing lens 18. An oscillator configuration also has a first reflector 54 and a second reflector 56 at respective ends of the optical fiber 24. The reflectors 54 and 56 are dichroic reflectors, each having a reflectivity value that is a function of the wavelength of the light.

One dichroic reflector 54 has a high reflectivity at the wavelength of the laser output light 30, but has a low reflectivity (i.e.. it is essentially transparent), at the wavelength of the input pump light 12. For example, for the thulium doped fiber, the pump light 12 wavelength can be in the range of 0.80 $\mu$m or 0.69 $\mu$m. Typically, a practical dichroic reflector for pump light 12 has a reflectivity down to only about 5%, or down to 1% or 2% for a higher performance dichroic reflector.

In contrast, reflector 56 should have a reflectivity of 70% to 95% at the laser wavelength and preferably a high reflectivity at the pump light 12 wavelength. The oscillator output light 30 can pass through a isolator 32 before being received by an applications system 34.

Different approaches can be taken to extracting laser energy from an oscillator configuration. One approach is to have a lower reflectivity at the laser wavelength for reflector 56. The result is that light can readily get out from only one end of the optical fiber 24, but there is still a relatively high amount of reflection in order to initiate oscillation of the laser light 30. A suitable range of the output reflectivity values for the laser wavelength in the region of 1.47 $\mu$m would be between about 1% to about 40%, preferably in the range of 5% to 10%.

The length of the optical fiber 24 is also an important consideration in the design of an oscillator configuration. If the optical fiber 24 is long enough, the pump light 12 will essentially be entirely absorbed before it traverses the length of the optical fiber 24. If this is done intentionally, it really does not matter what the reflectivity is at the pump light 12 wavelength for the 56 reflector.

But for most applications, it is desirable to minimize the length of the optical fiber 24 to avoid unnecessary pump power losses. One benefit of a shorter length fiber is that it is less expensive than a longer fiber. Thus, in an alternative configuration, the reflector 56 can employ a dichroic reflector which is a good reflector at the wavelength for light 12 so that the pump source light 12 is reflected back to make a second pass in the optical fiber 12. Choosing the length of optical fiber 24 so that only 50% to 60% of the pump light 12 is absorbed in a single traverse through the optical fiber 24. On a second pass, 50% or 60% of the light is absorbed again.

Figure 5:
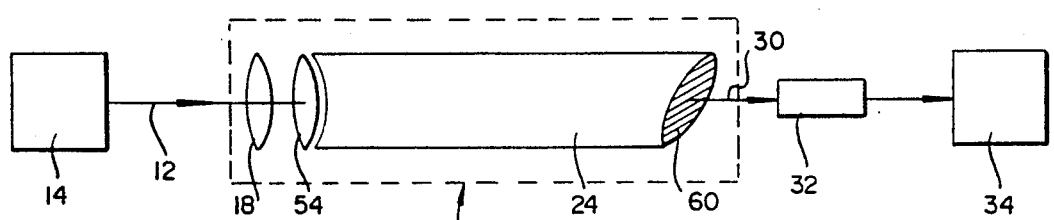
FIG. 5 is a diagram of a the present invention in a superluminescence source configuration.

Another configuration of the present invention is in a laser device 11 which is a superluminescence source, as illustrated in FIG. 5. A superluminescence source configuration does not use a coherent input signal such as light 4 in FIG. 1, but amplifies spontaneous emission produced in the optical fiber 24. Light produced by the superluminescence source has a bandwidth and other properties that look like ordinary fluorescence, but it is much brighter.

FIG. 5 shows source 14 producing pump light 12. Light 12 passes through a lens 18, which focuses the light 12 on optical fiber 24 so as to directly or indirectly energize the thulium. Light 12 first passes through a dichroic end reflector 54, which is transparent to light 12 but highly reflective to light produced in superluminescence source device 11. Unlike the configuration in FIG. 4, there is no output end reflector. Instead, there can be an antireflection coated end or an end surface 60 cut at an angle of 10 to 20 degrees off the perpendicular to the axis 52 of the optical fiber 24, to minimize the end reflection. Light 30 passes through an optical isolator 32 and on to an application 24.

The aforementioned description is not to be interpreted to exclude other lasers and systems advantageously employing the present invention. For example, while it is understood that the present invention may be used in telecommunication application, it could also be used as a pump for an erbium optical amplifier, to expand the spectral range for wave length dispersive multiplexed systems. A multiplexed system uses more than one wavelength to increase the overall signal capacity of the system. Systems which use only one wavelength to send different signals can do so by sending different signals as pulses. Multiple wavelength transmission adds extra channels to increase the capacity of the system to communicate multiple signals. A wavelength selective device is then used to separate the various signals.

The system 11 could also be used as a pump for an erbium amplifier at 1.47 $\mu$m. This function could be provided by an oscillator of the present invention as described above, due to the close proximity of the 1.47 $\mu$m pump wavelength and the 1.55 $\mu$m wavelength of the erbium. Additionally, this would provide a fiber optic source capable of pumping erbium, eliminating the need to couple laser diodes to a three-level erbium system.

Additional applications 34 are in the medical field in sensing at the above-referenced wavelength. Thus, it is to be understood that the above-described four-level multiply doped laser is merely an illustrative embodiment of the principles of this invention and that numerous other arrangements and advantages may be appreciated by those skilled in the art without departing from the spirit and scope of the invention.

What is claimed is:

1. A system for producing an optical gain, the system comprising:
   a. a pump light source;
   b. a host operably connected to receive energy from said pump light source, said host having a light conducting path doped with thulium, holmium and at least one rare earth from the group consisting of europium and terbium in respective amounts sufficient to produce an optical gain energizing thulium to a $^3H_4$ state to produce an optical gain by a $^3H_4$–$^3F_4$ transition and a gain in a region of 1.47 $\mu$m, with subsequent energy transfer from the $^3H_4$ state of the thulium to a $^5I_7$ state of the holmium, and energy transfer from the $^5I_7$ state to the rare earth.

2. The system of claim 1, wherein the light conducting path includes a core having an index of refraction, the core being circumferentially surrounded by a cladding with a lower index of refraction to form an optical fiber.

3. A system for producing an optical gain, the system comprising:
   a. a pump light source;
   b. a halide glass host operably connected to receive energy from said pump light source, said host having a light conducting path doped with thulium, holmium and at least one rare earth from the group consisting of europium and terbium in respective amounts sufficient to produce an optical gain from energizing the thulium to a $^3H_4$ state to produce an optical gain by a $^3H_4$-$^3F_4$ transition and a gain in the regions of 1.47 $\mu$m, with subsequent energy transfer from the $^3F_4$ state of the thulium to a $^5I_7$ state of the holmium, and energy transfer from the $^5I_7$ state to the rare earth.

4. The system of claim 3, wherein the host is a fluoride glass.

5. The system of claim 4, wherein the core is made of a glass comprising the fluorides of zirconium, barium, lanthanum, aluminum, and sodium.

6. The system of claim 4, wherein the core further comprises:
   40 to 60 mole percent zirconium fluoride;
   15 to 25 mole percent barium fluoride;
   0 to 6 mole percent lanthanum fluoride;
   2 to 5 mole percent aluminum fluoride; and
   0 to 25 mole percent sodium fluoride.

7. The system of claim 6, wherein the core is doped with 0.01 to 1.0 mole percent of thulium.

8. The system of claim 6, wherein the core is doped with 0.10 to 2.0 mole percent holmium.

9. The system of claim 6, wherein the core is doped with 0 to 0.30 mole percent of europium.

10. The system of claim 6, wherein the core is doped with 0 to 0.30 mole percent of terbium.

11. The system of claim 2, wherein the cladding is circumferentially surrounded by a second cladding glass with a lower index of refraction than that of the first cladding.

12. The system of claim 11, wherein the first cladding is glass doped with 0 to 0.30 mole percent europium.

13. The system of claim 11, wherein the first cladding is glass doped with 0 to 0.30 mole percent terbium.

14. A method of making a doped fluoride laser comprising the steps of:
   forming an optical fiber having a core, a cladding a first endface and a second endface, from a fluoride glass containing zirconium, barium, lanthanum, aluminum, sodium, thulium, holmium, and at least one rare earth dopant selected from the group consisting of europium and terbium, and
   energizing said optical fiber the thulium to a $^3H_4$ state to produce an optical gain in a region of 1.47 $\mu$m.

15. The method of claim 14, where the rare earth dopant is between 0 to 0.30 mole percent of europium.

16. The method of claim 14, where the rare earth dopant is between 0 to 0.30 mole percent of terbium.

17. The method of claim 14, in which the fluoride glass contains 40 to 60 mole percent zirconium fluoride, 15 to 25 mole percent barium fluoride, 0 to 6 mole percent lanthanum fluoride, 2 to 5 mole percent aluminum fluoride, 0 to 5 mole percent sodium fluoride, 0.01 to 1.0 mole percent thulium, and 0.10 to 2.0 mole percent holmium.

18. The method of claim 14, further comprising the step of coupling dielectric mirrors to first and second endfaces of the fiber.

19. The method of claim 14, wherein the system is an amplifier for telecommunications applications.

20. The method of claim 14, wherein the system is an oscillator further comprising the steps of:
   coupling a first dichroic reflector to the first endface of the optical fiber; and
   coupling a second dichroic reflector to the second endface of the optical fiber.

21. The method of claim 14, wherein the system is a superluminescence source further comprising the step of coupling a first dichroic reflector to the first endface of the optical fiber.

22. A system for producing an optical gain comprising a pump light source and further comprising a core comprised of multiple individual optical fibers of the fluorides of zirconium, barium, lanthanum, aluminum and sodium and a first cladding surrounding the core, at least one of said fibers being doped with thulium, holmium and at least one rare earth from the group consisting of europium and terbium.

23. The system of claim 22, wherein multiple glass fibers further comprises:
   40 to 60 mole percent zirconium fluoride;
   15 to 25 mole percent barium fluoride;
   0 to 6 mole percent lanthanum fluoride;
   2 to 5 mole percent aluminum fluoride; and
   0 to 25 mole percent sodium fluoride.

24. The system of claim 22, wherein the core further comprises at least one fiber doped with 0.10 to 1.0 mole percent of thulium.

25. The system of claim 22, wherein the core further comprises at least one fiber doped with 0.10 to 2.0 mole percent holmium.

26. The system of claim 22, wherein the core further comprises at least one fiber doped with 0.10 to 0.30 mole percent of europium.

27. The system of claim 22, wherein the core further comprises at least one fiber doped with 0.10 to 0.30 mole percent of terbium.

28. An amplifier for amplifying the light from a light pump comprising:
   an optical fiber fluoride glass core having an index of refraction and comprising zirconium, barium, aluminum, lanthanum and sodium;
   a cladding layer having an index of refraction less than the index of refraction of the fluoride glass core; and
   the fluoride glass core further comprising the dopants thulium, holmium and at least one rare earth dopant to produce a gain in the $^3H_4$ state to produce light amplification.

29. The amplifier of claim 28, wherein the rare earth dopant is europium.

30. The amplifier of claim 28, wherein the rare earth dopant is terbium.

31. A method for using a optical fiber having a glass core, a first cladding circumferentially surrounding the core, a first endface and a second endface, the glass core being doped with thulium, holmium, and at least one rare earth dopant selected from the group consisting of europium and terbium for amplifying the light of a light pump comprising the steps of:
   coupling the first endface of the optical fiber to a light pump;

pumping light into the first endface of the optical fiber; and producing an output signal from the second endface of the optical fiber.

32. The method of claim 31, further comprising the step of coupling a signal light to the first endface of the optical fiber.

33. The method of claim 31, further comprising the step of coupling a signal light to the second endface of the optical fiber.

34. A system for producing an optical gain, the system comprising:
   a. a pump light source;
   b. a host operably connected to receive energy from said pump light source, said host having a light conducting path doped with thulium, holmium and dopant means for depopulating the $^5I_7$ state of the holmium in respective amounts sufficient to produce an optical gain from energizing the thulium to a $^3H_4$ state producing optical gain by a $^3H_4$–$^3F_4$ transition and a gain in a region of 1.47 $\mu$m, with subsequent energy transfer from $^3H_4$ state of thulium to a $^5I_7$ state of the holmium, and energy transfer from the $^5I_7$ state to the dopant means for depopulating the $^5I_7$ state of the holmium.

35. A system of claim 34, wherein the dopant means is europium.

36. A system of claim 35, wherein the dopant means is terbium.

* * * * *